United States Patent [19]

Munsey

[11] 3,847,067
[45] Nov. 12, 1974

[54] ELECTRICALLY HEATED CORN POPPER AND FOOD WARMING APPARATUS

[75] Inventor: George B. Munsey, Little Rock, Ark.

[73] Assignee: Munsey Products, Inc., Little Rock, Ark.

[22] Filed: Mar. 12, 1973

[21] Appl. No.: 340,083

[52] U.S. Cl. .................................. 99/323.8, 99/345
[51] Int. Cl. ................................................ A23l 1/18
[58] Field of Search ........ 99/323, 323.4, 323.8, 345

[56] References Cited
UNITED STATES PATENTS
3,722,399   3/1973   Cole .................................... 99/323.8
3,774,523   11/1973   Moot .................................. 99/323.8

Primary Examiner—John W. Huckert
Assistant Examiner—Jon W. Henry
Attorney, Agent, or Firm—Watson, Cole, Grindle & Watson

[57] ABSTRACT

An electrically heated corn popper and food warming apparatus including a receptacle for containing the corn to be popped, a stand supporting the receptacle, electric heating means provided within the stand, a deep-dished cover for the receptacle, a butter container removably mounted at the top inner portion of the cover, and cooperating handles on both the receptacle and cover for handling the apparatus during operation.

7 Claims, 3 Drawing Figures

ELECTRICALLY HEATED CORN POPPER AND FOOD WARMING APPARATUS

This invention relates generally to an apparatus for use as a corn popper or as a food warmer.

More particularly, the apparatus of the invention includes a receptacle for containing a quantity of, for example, corn to be popped, a stand base supporting the receptacle, and a deep-dished cover for the receptacle having a butter container removably mounted at the top inner portion thereof. The bottom portion of the receptacle is formed as a truncated cone defining a conical section and a flat central portion. The inner surface of the bottom wall of the stand, in the form of a cup-shaped element, has a raised and flat central portion so that the receptacle may be supported not only along the peripheral edge of the cup-shaped base but also in abutment with the raised central portion thereof. The principal object of this invention is therefore to provide a corn popper and food warming apparatus which improves on the stability of the support for the receptacle containing the food.

Another object is to provide such an apparatus wherein the cover is supported within the receptacle by means of handles extending outwardly therefrom, handles are also provided on the receptacle for cooperation with the cover handles which may together be grasped to remove the cover and receptacle and to turn the cover upside down, thereby converting it to a receptacle for the popped corn. Accordingly, the top wall of the cover is made flat.

Another object of this invention is to provide such an apparatus wherein electric heating means is provided within the stand, such means including a circular electric coil surrounding the raised portion of the cup-shaped element bottom wall and being adjacent the conical section of the receptacle bottom to thereby dissipate the heat more evenly over the bottom portion of the receptacle.

A still further object of this invention is to provide such an apparatus wherein the receptacle bottom wall is provided with a peripheral depression along the conical section thereof for contacting engagement with the peripheral edge of the stand thereby further stabilizing the support of the receptacle on the stand.

Other objects, advantages and novel features of the invention will become apparent from the following detailed description of the invention when considered in conjunction with the accompanying drawings wherein.

Figure 1:
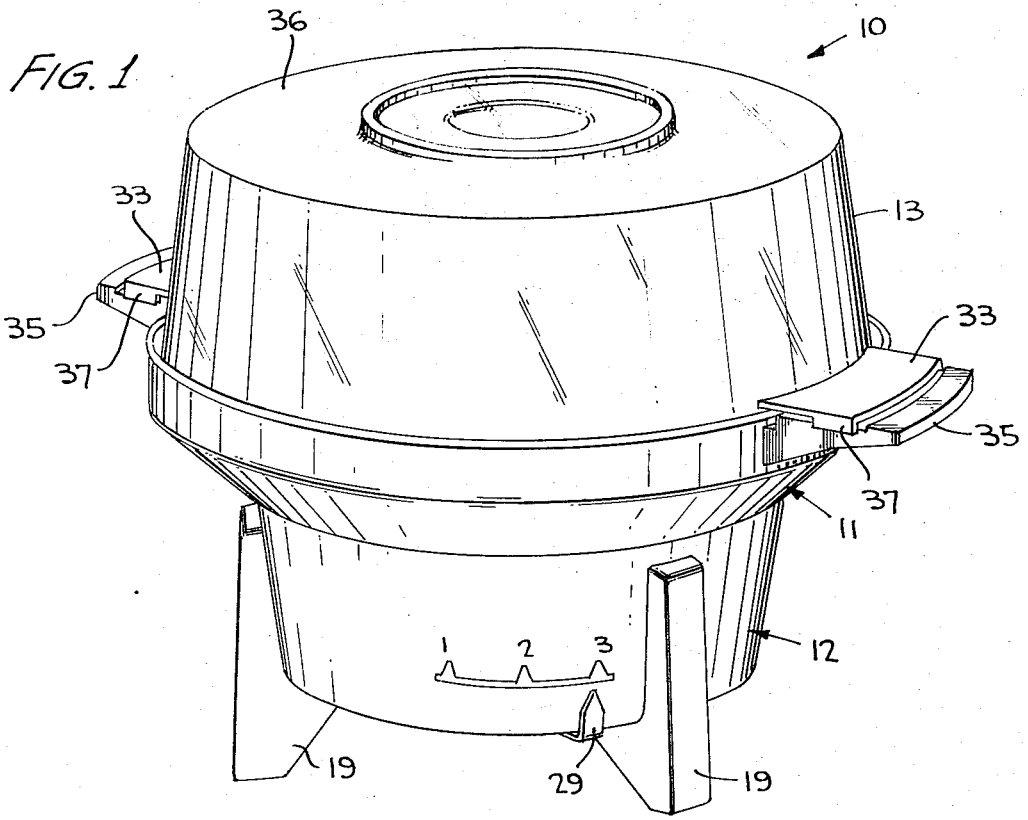
FIG. 1 is a perspective view of the assembled apparatus constructed in accordance with the present invention.
Figure 2:
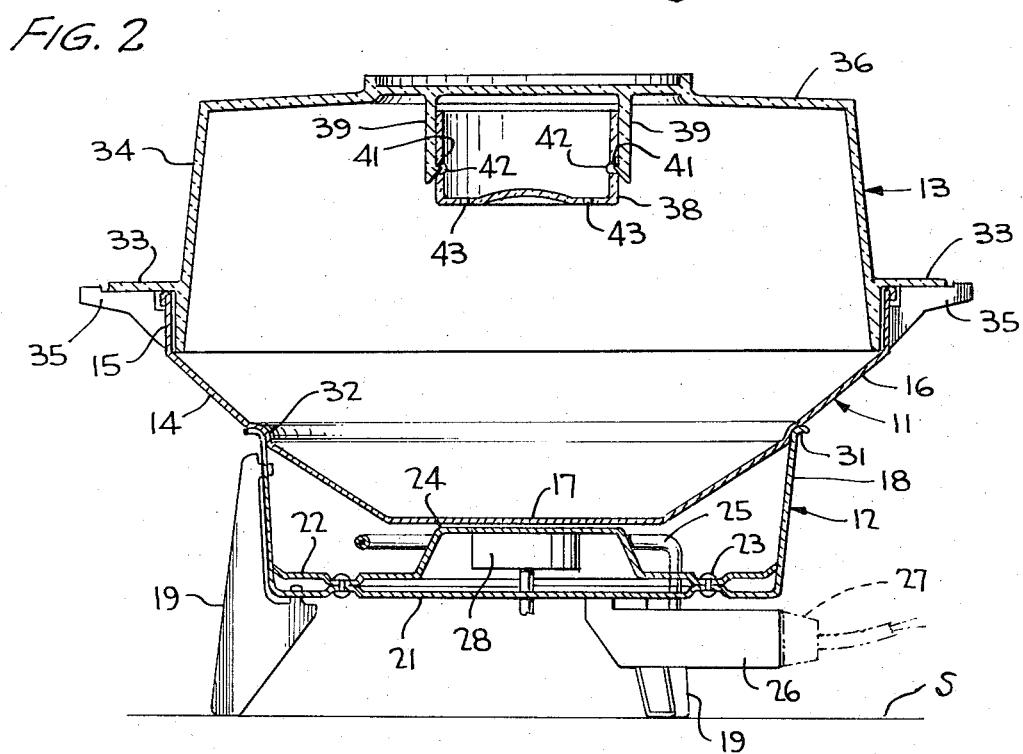
FIG. 2 is a vertical sectional view taken through the apparatus shown in FIG. 1.

Turning now to the drawings wherein like reference characters refer to like and corresponding parts throughout the several views, there is shown in FIG. 1 the apparatus 10 constructed in accordance with the present invention which, as seen even more clearly in FIG. 2, includes a receptacle 11 for containing a quantity of corn to be popped or the food to be warmed, a stand 12 supporting the receptacle and a cover 13 supported by the receptacle.

Receptacle 11 includes a bottom portion 14 and a circular sidewall 15, the bottom portion being formed as a truncated cone defining a conical section 16 and a flat and central portion 17.

Stand 12 is in the form of a cup-shaped element 18 with support legs 19 connected therewith for supporting the cup-shaped element a slight distance above surface S. The flat bottom wall 21 of element 18 is of a two-ply construction, the inner ply of which is constituted by a plate 22 riveted or otherwise connected to the bottom wall as at 23. Plate 22 has a raised and flat central portion 24. An electric heating means is also provided on the stand and includes a circular heating element 25 surrounding central portion 24 and being operatively connected in the normal manner to an electric socket 26 for the reception of the standard electric plug 27 shown in dashed outline. Also, a rheostat 28 is operatively mounted within raised portion 24 and is connected for rotation by means of a lever 29 so that the current may be varied as the lever is moved between markings 1 and 3 provided on the sidewall of the cup-shaped element 18.

The upper peripheral edge of element 18 has a rounded and outwardly extending flange 31 in contacting engagement with a peripheral indent 32 provided on conical section 16 of the receptacle. Accordingly, the receptacle is supported by the stand by means of both this contacting engagement and the surface contact between central portions 17 and 24 whereby the receptacle is stabilized and any shifting thereof while being so supported is minimized.

Figure 3:
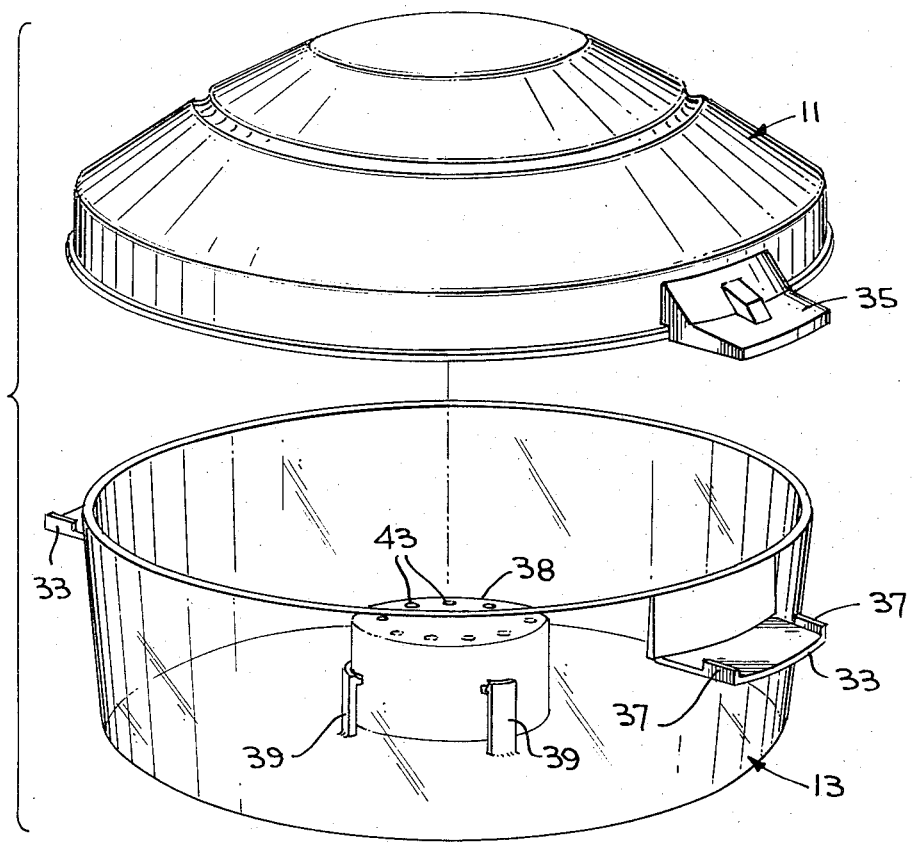
FIG. 3 is an exploded perspective view of the receptacle and the cover after having been removed from the stand and showing the manner in which the cover may be converted into a receptacle for the popped corn.

Flat and elongated outwardly extending handles 33 are provided on sidewall 34 of cover 13 for supporting the cover on the receptacle at the upper edge of sidewall 15 thereof. Also, each of the flanges 33 cooperates with respective handles 35 provided on sidewall 15 of the receptacle. The cooperating pairs of handles 33, 35 at opposite sides of the cover and receptacle may be grasped by the operator for lifting the receptacle and cover off the stand after the corn has been completely popped, and flipping the cover and receptacle over so that the cover may be placed with its flat wall 36 on the surface S (see FIG. 3). Accordingly, the cover may be used as a serving dish for the popped corn. Also, depending ears 37 are provided at opposite ends thereof to prevent relative rotation between the cover and receptacle while handles 33 and 35 are in contacting engagement with one another.

A butter container 38 is removably mounted to the underside of wall 36 of the cover by means of resilient legs 39. Each of these legs has an inward projection 41 thereon for the reception within respective openings 42 provided in the sidewall 40 of the butter container. The butter container has further openings 43 therein to permit the butter to be drained therefrom onto the popped corn during the popping operation.

Butter container 38 and cover 13 may be of a Plexiglas or similar plastic construction, while receptacle 11 and cup-shaped element 18 may be of an aluminum construction.

From the foregoing, it can be seen that a simple yet highly effective corn popper and food warming apparatus has been devised wherein the electric heating coil is capable of more evenly distributing the heat over the bottom portion of the receptacle since it is generally disposed adjacent the conical section thereof. The flat central portion 17 of the receptacle rests against a correspondingly flat central portion 24 of plate 22 provided within the stand so that together with beaded flange 37 of element 18, the receptacle is evenly and fully supported by the stand. Moreover the cooperating handles on the cover and receptacle permit easy manipulation thereof, and the butter container is easily removable and is capable of being conveniently inserted in place.

Obviously, many modifications and variations of the invention are possible in the light of the above teachings. It is therefore to be understood that within the scope of the appended claims, the invention may be practiced otherwise than as specifically described.

What is claimed is:

1. A corn popper and food warming apparatus comprising a receptacle having a bottom portion and circular sidewall for containing a quantity of corn to be popped, a stand base supporting said receptacle, said base including an upwardly open cup-shaped element having a bottom wall and a circular sidewall for the reception of said bottom portion of said receptacle, legs on said cup-shaped element, a deep-dished cover for said receptacle, said cover having a circular sidewall, a butter container removably mounted at the top inner portion of said cover, a receptacle support plate connected to the inner surface of said bottom wall, said plate having a raised and flat central portion spaced from said inner surface, electric heating element surrounding said raised and flat central portion, and said bottom portion of said receptacle being formed as a truncated cone defining a conical section and a flat and central portion, said conical section being supported along the peripheral edge of said base circular sidewall and said flat central portions abutting one another to stabilize the support of said receptacle.

2. The apparatus according to claim 1 wherein said receptacle circular sidewall is of a slightly larger diameter as compared to the diameter of said cover circular sidewall for the reception of said cover.

3. The apparatus according to claim 1 wherein said conical section of said receptacle is provided with a peripheral depression for contacting engagement with said peripheral edge of said base circular sidewall.

4. The apparatus according to claim 1 wherein first handles are provided on said cover and second handles are provided on said receptacle for cooperation with respective ones of said first handles, said first handles being in contacting engagement with the peripheral edge of said receptacle sidewall thereby supporting said cover within said receptacle.

5. The apparatus according to claim 4 wherein each of said second handles is slightly longer as compared to the length of its associated first handle, and a depending ear being provided at each end of each said first handle overlapping respective ends of their associated second handles to prevent relative rotation between said cover and said receptacle during operation of the apparatus.

6. The apparatus according to claim 1 wherein said top portion of said cover has a substantially flat outer surface whereby said cover may be converted into a container for the corn which has been popped.

7. The apparatus according to claim 1 wherein said container is mounted by means of resilient legs connected to said top inner portion of said cover, a slot provided on said container for the reception of a projection on each of said legs, said container also having a plurality of small openings therein for draining the butter therefrom.

* * * * *